UNITED STATES PATENT OFFICE.

BERNARD HERSTEIN, OF BAYONNE, NEW JERSEY.

NITRO DERIVATIVE OF CELLULOSE AND PROCESS OF MAKING SAME.

No. 879,871.  Specification of Letters Patent.  Patented Feb. 25, 1908.

Application filed August 17, 1905. Serial No. 274,544.

*To all whom it may concern:*

Be it known that I, BERNARD HERSTEIN, a resident of Bayonne, Hudson county, State of New Jersey, (post-office address No. 45 Cliff street, borough of Manhattan, city, county, and State of New York,) have invented certain new and useful Improvements in Nitro Derivatives of Cellulose and Processes of Making Same, of which the following is a specification.

My invention relates to a new manner of treating cellulose for the purpose of converting it into a new structureless nitro derivative, easy and safe to handle, cheap to manufacture and not dangerously inflammable.

In treating cellulose with sulfuric acid and nitric acid, it has heretofore been the custom to use these acids of high strength containing the smallest possible percentage of water, with the result that nitration proceeded from the surface of the cellulose toward the center, the cellulose becoming opaque wherever the nitrating mixture penetrated, while the original structure, as far as visible to the naked eye, remained unchanged.

By my invention, which consists primarily in the production of a gelatinous product of cellulose by the use of a peculiar acid mixture, I obtain a product which is radically different from any heretofore produced and which possesses valuable technical and commercial advantages, viz: being slow burning and practically unaffected by water, easily worked and economically manufactured.

In proceeding according to my invention I first immerse the cellulose either in the shape of thin paper, or in the shape of cotton, or the like, in an acid mixture containing about 63% by weight, of sulfuric acid ($H_2SO_4$) and about 10% of nitric acid ($HNO_3$), the remaining 27% being partly water, and partly other inert material. This mixture I obtain most conveniently by adding to 85 parts (volume) of sulfuric acid ($H_2SO_4$) of 1.66 specific gravity, 15 parts nitric acid ($HNO_3$) of about 1.42 specific gravity. A mixture such as this has never to my knowledge been used for treating cellulose, but has nevertheless the great advantages which I have already indicated. As soon as the cellulose is immersed in that mixture, reaction takes place and becomes promptly visible to the eye. The entire mass of cellulose loses entirely its structural characteristics and is converted into a gelatinous transparent magma. This immersion must take place at a low temperature, that is to say, the acid mixture must be cooled down to a temperature of about 20° C. or lower. It is desirable, and in fact essential, to work at a low temperature in order that the cellulose may not dissolve in the acid mixture, and to insure that it shall merely become thoroughly gelatinized.

Of course, in the preparation of the acid mixture, I have stated what I conceive to be the most advantageous ratio of acids, although these proportions may be varied, and although there is quite a range of proportions which will result in gelatinizing the cellulose. It is however absolutely essential for the production of my cellulose derivative, that whatever the percentage of ingredients in the acid mixture may be, the cellulose shall lose its structural appearance and become gelatinized. The production of this gelatinized cellulose derivative being the main object of my invention, the particular ratio between the quantities of anhydrid sulfuric acid, anhydrid nitric acid and water may be left to the selection of the manufacturer. After having been exposed to this acid mixture for a few minutes the excess of acid is poured off and the residue repeatedly washed with cold water in large quantities until all the acid is removed, and then pressed to expel any excess of water. The product obtained from this procedure is a nitro derivative of cellulose, structureless in appearance, and containing a small percentage of nitrogen. The actual percentage of nitrogen varies considerably with the conditions of the manufacture. It may however be said that in various experiments which I have made the percentage of nitrogen obtained was never higher than about $4\frac{1}{2}\%$ and often considerably below that. Since the so-called mono-nitro-cellulose, which heretofore has been considered the lowest nitro-cellulose possible, (no substance having yet been produced which was proved to be mono-nitro-cellulose to the complete satisfaction of chemists) contains 6.77% of nitrogen, theoretically, it is evident that the product obtained by me is one entirely different from anything heretofore known, being derived only from a cellulose of multiple molecular form. It might be likened to a fluffy, almost granular homogeneous structure, and differs radically from any nitro cellulose derivative heretofore known, in that none of the common solvents, such as ether, alcohol, acetone, amylacetate, or a mixture of these, will act upon it under ordinary circumstances. But the most characteristic feature of my above-described product lies in the following fact: The nitro celluloses, known heretofore, when brought in contact with caustic alkali solutions, merely lose part of their nitric acid, while their structural appearance remains unchanged. My product however, upon being brought into intimate contact with even small quantities of caustic alkali solutions, such as caustic soda, gelatinizes very readily, and then forms a plastic transparent mass which can be molded into any suitable shape or size, and which can be diluted with water and pressed through fine orifices, or otherwise given form. In this form the substance or compound is in a colloidal semi-solution and can then be coagulated or hardened by applying to it weak acids, salts or many other substances, when it retains the shape which it had previously received from the mold. After removing all soluble ingredients with water and drying, the final product is one resembling horn, burning slowly, practic lly unaffected by water, except that water does slightly soften it. It is practically a pure nitro cellulose derivative containing no solvent in admixture with it. It can be worked into innumerable shapes by sawing, cutting, filing, sand-papering, etc., and will be found of extreme usefulness in the arts. But not only does my product gelatinize with caustic alkali, but it also yields readily to various organic compounds, as for instance phenol, resorcin and others, differentiating it characteristically from other nitro celluloses.

What I claim is:

1. The process of making nitro derivative of cellulose, which consists in treating cellulose with a mixture containing about 63% of sulfuric acid ($H_2SO_4$), about 10% of nitric acid ($HNO_3$) and about 27% of inert material.

2. The process of making a nitro derivative of cellulose, which consists in treating cellulose with a mixture containing about 63% of sulfuric acid ($H_2SO_4$), about 10% of nitric acid, ($HNO_3$) and about 27% of inert material, at a low temperature as specified until complete gelatinization is obtained.

3. The process of making a nitro derivative of cellulose, which consists in treating cellulose with a mixture containing about 63% of sulfuric acid ($H_2SO_4$), about 10% of nitric acid, ($HNO_3$) and about 27% of inert material, until complete gelatinization is obtained, and then washing out the acid.

4. As a new article of manufacture a nitro derivative of cellulose containing less than about four and one-half per cent. of nitrogen, said article being structureless, insoluble in ether, alcohol, acetone or amylacetate, and exhibiting the property of becoming gelatinized and transformed into a plastic transparent or translucent mass when treated with caustic soda.

5. As a new article of manufacture, a nitro derivative of cellulose containing four and one-half per cent. of nitrogen, said article being structureless and insoluble in ether, alcohol, acetone, or amylacetate.

In testimony whereof I have hereunto set my hand in the presence of two subscribing witnesses.

BERNARD HERSTEIN.

Witnesses:
FRTZ V. BRIESEN,
JOHN A. KEHLENBECK.